US 6,690,156 B1

(12) United States Patent
Weiner et al.

(10) Patent No.: US 6,690,156 B1
(45) Date of Patent: Feb. 10, 2004

(54) PHYSICAL OBJECT LOCATION APPARATUS AND METHOD AND A GRAPHIC DISPLAY DEVICE USING THE SAME

(75) Inventors: Avish Jacob Weiner, Tel Aviv (IL); Haim Perski, Hod Hasharon (IL); Meir Morag, Tel Aviv (IL)

(73) Assignee: N-trig Ltd., Tel Aviv (IL)

( * ) Notice: Subject to any disclaimer, the term of this patent is extended or adjusted under 35 U.S.C. 154(b) by 0 days.

(21) Appl. No.: 09/628,334

(22) Filed: Jul. 28, 2000

(51) Int. Cl.[7] .............................. G01B 7/14; G01R 27/00
(52) U.S. Cl. .................. 324/207.17; 324/226; 273/237; 463/1
(58) Field of Search ................ 324/207.17, 207.11, 324/207.22, 207.23, 207.24, 226; 345/173, 174; 340/568.1; 273/237, 238; 463/1, 30, 40

(56) References Cited

U.S. PATENT DOCUMENTS

| | | | | |
|---|---|---|---|---|
| 4,331,333 A | * | 5/1982 | Willcocks | 273/238 |
| 4,398,720 A | * | 8/1983 | Jones et al. | 273/238 |
| RE33,805 E | | 1/1992 | Yamanami et al. | |
| 5,129,654 A | * | 7/1992 | Bogner | 273/238 |
| RE34,187 E | | 3/1993 | Yamanami et al. | |
| 5,190,285 A | * | 3/1993 | Levy et al. | 273/237 |
| 5,661,269 A | | 8/1997 | Fukuzaki et al. | |
| 5,853,327 A | * | 12/1998 | Gilboa | 273/237 |

FOREIGN PATENT DOCUMENTS

| | | |
|---|---|---|
| JP | 05239474 | 9/1993 |
| JP | 05243103 | 9/1993 |

* cited by examiner

Primary Examiner—Walter E. Snow
(74) Attorney, Agent, or Firm—G. E. Ehrlich (1995) Ltd.

(57) ABSTRACT

A device for detecting physical objects, each object having a detectable identifier, the objects being disposed in association with a graphic display device, comprising a detector operable to detect a location of said identifier relative to said graphic display device, and to output a signal bearing information of said first location, wherein said device is operable to determine, by electronic processing, from said signal, a relative location of said physical object in relation to said graphic display device.

70 Claims, 12 Drawing Sheets

Th  transparent foils layout
1: The first foil:
Patterns of the inductors are etched on ITO transparent foil in vertical direction.
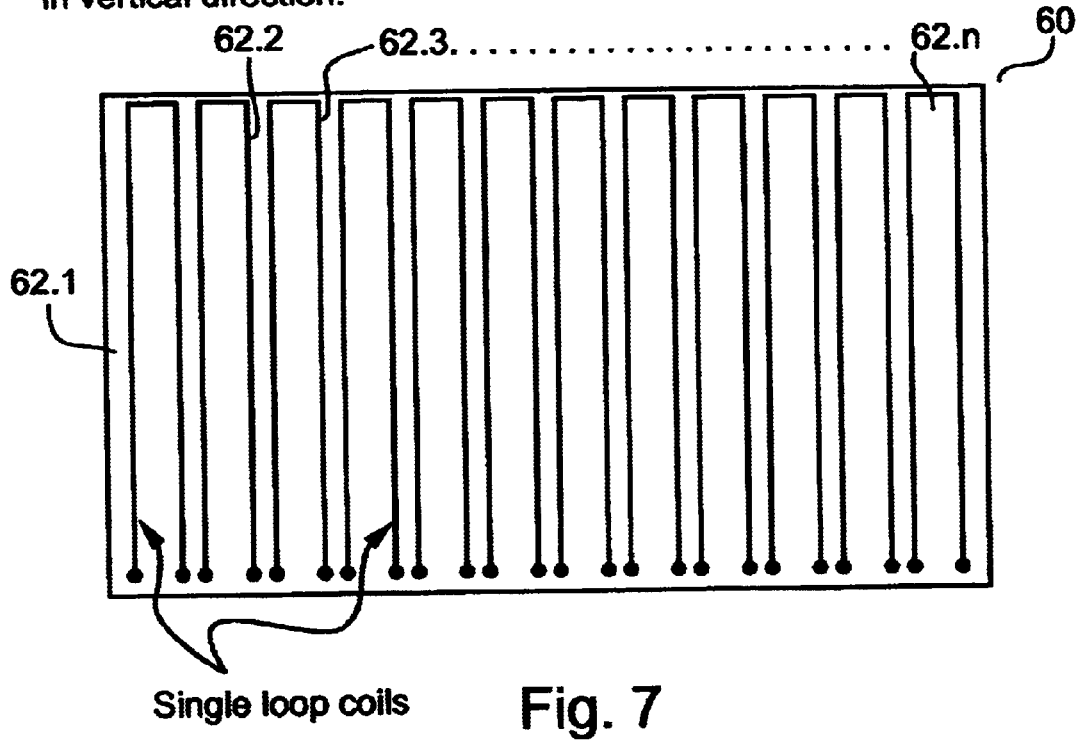
Single loop coils     Fig. 7
2: The second foil:
Patterns of the inductors are etched on ITO transparent foil in horizontal direction.
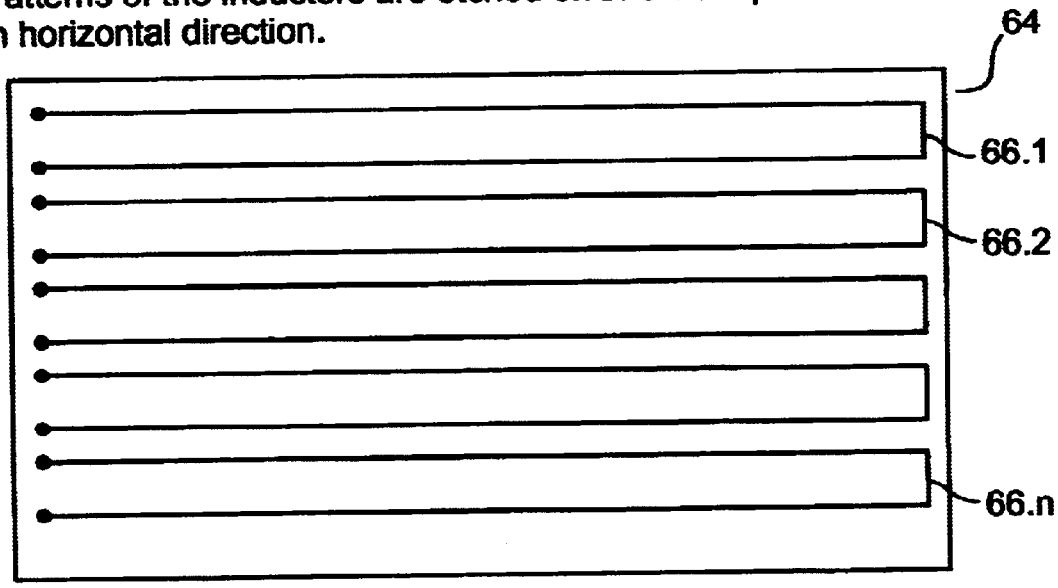
Fig. 8

When foil 1 is placed on foil 2 the overall pattern will be:

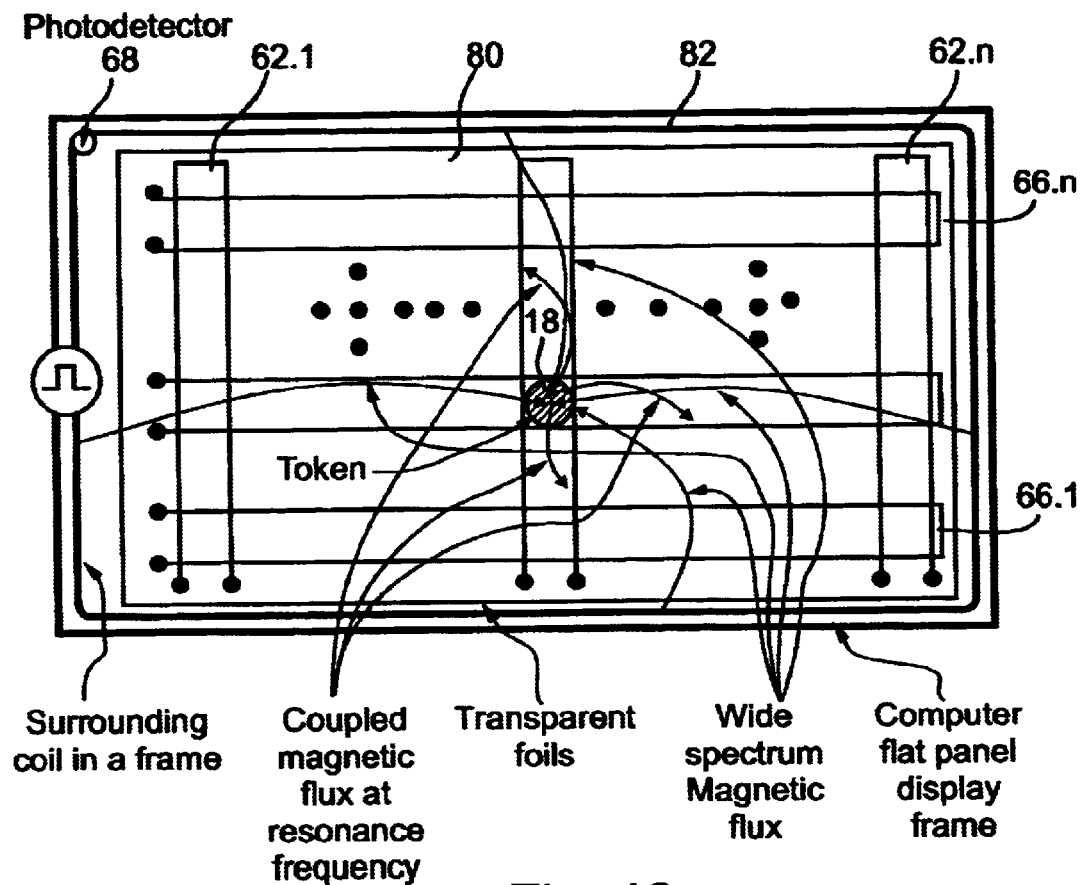
Fig. 12
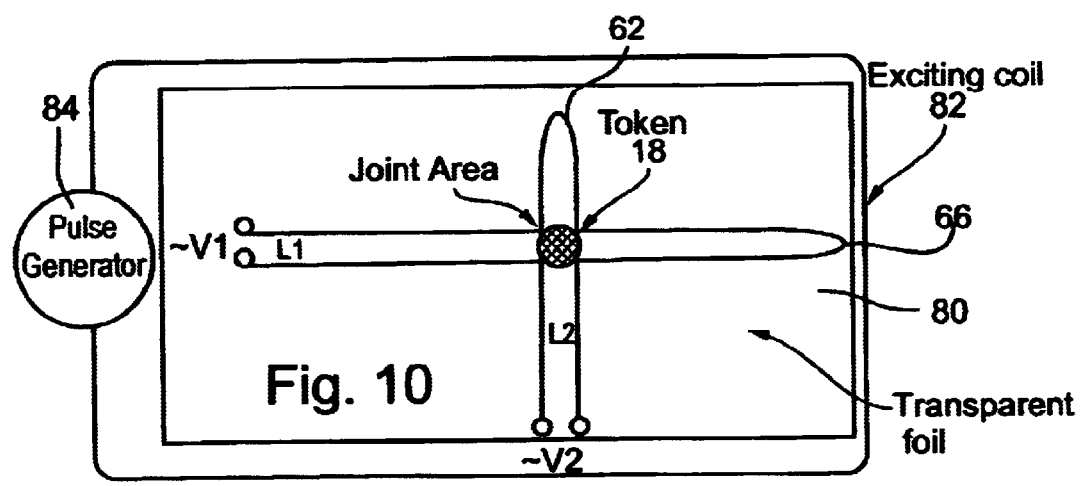
Fig. 10
Fig. 13

Token Resonance (tank) Circuit

Electronic Block Diagram

A Typical Timing Diagram

PHYSICAL OBJECT LOCATION APPARATUS AND METHOD AND A GRAPHIC DISPLAY DEVICE USING THE SAME

FIELD OF THE INVENTION

The present invention relates to physical object location and more particularly but not exclusively to physical object detection for keeping track of the objects, which may be playing pieces or tokens in a game, and moving the objects. The object detection may be pat of a game or simulation platform.

BACKGROUND OF THE INVENTION

Traditionally, games have been played on a specially marked out playing surface or game board, and tokens are moved around the board in accordance with a set of rules.

More recently, however, games, simulations and the like have been run on computers, and many of the traditional board games have been computerized. Typically, the computerized board game has involved an animated board appearing on the screen, with animated playing tokens being moved around the board. Interactions between the player and the computer are carried out in the normal way using standard interface devices such as a keyboard, mouse and joystick.

Gameplay involving multiple players is awkward, especially if play is restricted to a single computer. Also it can be difficult for people used to tokens on a board to adjust to screen displays.

There have thus been numerous attempts to enable a computer to use physical playing pieces and a game board so as to make the computer/human interface as natural as possible.

The earliest attempts, from the times when computers able to play games first because available, involved the player setting up a board with playing pieces, making his move on the board, keying his move in to the computer and then waiting for the computer to indicate its move. The computer's move was then physically made by the user on the board. However there was no direct interaction between the computer and the board.

A number of existing patents allow for direct interaction between the computer and physical playing pieces set on a board. The interaction is typically based on apparatus bad within the playing pieces or tokens and corresponding sensing apparatus connected to a computer. In order for the computer to interact directly with the pieces, the human players and the board, such a sensing mechanism is needed to enable automatic location of the physical pieces or tokens relative to the board and preferably also to provide an ability to distinguish between the tokens.

A number of patents to Wacom describe electronic drawing devices or styluses. The movement of the stylus over a tablet is traced electronically and used to generate computerized drawing. Excitation is applied to a resonant circuit in the stylus, electromagnetic radiation emitted by the resonant circuit is detected by a sensing mechanism and location processing is used to locate the stylus. U.S. Pat. No. 6,005,555 is one such patent, in which a position detecting apparatus is disclosed which is capable of detecting position pointing devices of any combination simultaneously out of plural position pointing devices. A frequency of a resonance circuit provided inside a position pointing device is set by a command signal transmitted from a tablet, causing plural position pointing devices placed on the tablet to have different frequencies, thereby suppressing electromagnetic interference among position pointing devices on the tablet, so that simultaneous detection becomes available.

A key problem with the use of such a system in conjunction with a gameboard is that a layer of conductors arranged in a grid is placed on the tablet to give the device sufficient resolution in locating the stylus. In a game, the gameboard, however, should preferably be seen without interference.

U.S. Pat. No. 5,188,368 to Ryan describes playing pieces having tuned circuits within. Each or the tuned circuits is tuned to a different frequency so that the playing pieces can be distinguished. The game board is divided into cells and coil circuits are embedded within the playing surface or game board, one per cell. The coil circuits are activated in turn, to excite the tuned circuits of any piece that may be located in the cell. A response is taken to indicate that a piece is located in the cell.

U.S. Pat. No. 5,853,327 to Gilboa, describes playing pieces containing an electromagnetic transponder arranged to give a coded signal identifying the individual playing piece. The game board is a flat surface on which are placed paper sheets representing the game. The board is divided into cells, each of which comprises an electromagnetic excitation coil built into the board. The cells are excited on a row and column basis and the position of each piece is determined.

In both of these solutions, the coil or transponder has to be built into the playing surface. Neither of these solutions disclose a combination of a sensing apparatus with an electronic screen.

Applicant's co-pending application. U.S. Ser. No. 09/1382,167 describes an active solution, meaning a solution involving playing tokens having powered circuitry therein, in which individual tokens visually detect activated pixels on a flat display screen used as a game board. The token transmits a signal when a pixel, over which the token is positioned, is activated, and the system is able to use the transmitted signal to deduce the position of the token because it knows which pixel was activated at the given time. Embodiments allow for search patterns of the activated pixels, and tokens with individually identifiable signals. The signals may be infrared, ultrasound and the like. In addition, embodiments provide for artificial computer players, or for remote players located over a network and whose moves may be made by a robot arm.

This solution allows detection to be provided in conjunction with an electronic screen. Being an active solution, however, it requires the tokens to have an independent power source. That is to say, there is a battery which requires to be replaced from time to time. Furthermore dirt picked up on the bottom of the piece can obscure the sensor.

SUMMARY OF THE INVENTION

Embodiments of the present invention allow for accurate determination of the location and identity of playing pieces on a playing board, such that one or more players are able to play a game in which some of those players may be artificial players and some may be remotely located players, playing for example over a network.

Embodiments of the present invention also provide for a solution which may be used in conjunction With an electronic screen and wherein a small amount of dirt on the playing piece will not interfere with use.

The present invention preferably utilizes a robotic arm, in conjunction with an accurate location and identification system, in order to move tokens in the game on behalf of artificial or remote players.

According to a first aspect of the present invention there is thus provided a method of detecting each one of a set of physical objects, placed in association with a graphic display device, each of said objects comprising an identifier, the method comprising:

placing at least one of said objects at a location in association with said graphic display device, detecting said identifier by means of a detector, outputting a signal from said detector, which signal bears information of said location and determining from said signal, information of said location.

In a preferred embodiment, each object has a unique identity within said set, wherein said indicator is indicative of said identity, said signal output from said detector further bearing information of said unique identity and wherein said step of determining comprises determining said unique identity.

In a further preferred embodiment, said identifier is a visual identifier, and said step of determining includes image processing.

In a farther preferred embodiment, said identifier is an electronic identifier, said identifier producing an output which is identifiable within said set.

In a further preferred embodiment, said electronic identifier is a resonant circuit and said output is electromagnetic radiation at a frequency unique within said set.

In a further preferred embodiment, said identifier is a transmitter, there is provided a step of triggering said transmitter to emit a signal, there is provided a step of measuring one of a group comprising the time delay between triggering and a receipt of said emitted signal a phase change to each one of a plurality of receivers and, and there is provided a step of deducing the location of the object by comparing said one of said group to each of said plurality of receivers.

Preferably, said transmitter is any one of a group comprising an ultrasound transmitter, an infrared transmitter, a radio frequency transmitter and a microwave transmitter.

Preferably, said physical object is externally powered.

Alternatively, said physical object is internally powered.

Preferably, said physical object is any one of a group comprising a game piece, a simulation piece and a pointer.

In an embodiment, said graphic display device is a flat screen graphic display device.

Alternatively, said graphic display device device is a tablet device.

Preferably, there is provided a further step of using a token moving subsystem to move said at least one physical abject over said graphic display device.

Preferably, said token moving subsystem includes an actuable, or robot, arm.

Preferably, the actuable arm comprises an identifier.

Preferably, there is provided a registration step, carried out before said determining step, of indicating a plurality of known positions on said graphic display device, detecting said known positions and mapping between said known positions and said detected positions.

Preferably, said detector comprises a coordinate system of detecting coils arranged on said graphic display device.

Preferably, each of the objects is excitable by a predetermined resonant frequency respectively, wherein said graphic display device is surrounded by an excitation coil operable to output a signal detectable by objects in said set each having a different resonant frequency, to excite said objects.

Preferably, the signal is a wide band signal, which may be implemented as a train of short pulses. Alternatively, it could he a series of frequencies corresponding to resonant frequencies of said identifiers of respective objects in said set.

The embodiments of the present invention may typically be comprised in either one of a group comprising a game and a simulation.

According to a second aspect of the present invention, there is provided a device for detecting physical objects, each object having a detectable identifier, the objects being disposed in association with a graphic display device, comprising a detector operable to detect a location of said identifier relative to said graphic display device, and to output a signal bearing information of said first location, wherein said device is operable to determine, by electronic processing, from said signal, a relative location of said physical object in relation to said graphic display device.

Preferably, there is provided a set of physical objects to be detected and said identifier is unique to each physical object within said set. in a preferred embodiment, said detector is a camera and said electronic processing comprises image processing, preferably, said identifier is a visually sensible mark.

Preferably, said visually sensible mark is selected for effectiveness in conjunction with an image processing algorithm being used.

In an alternative embodiment, said identifier is a resonant circuit having a resonant frequency.

Preferably, there is provided a set of physical objects to be detected, each object having a unique resonant frequency.

An embodiment has a grid laid out over said graphic display device, said grid comprising conductors.

Preferably, said conductor, are embedded in at least one transparent foil. A particular embodiment uses two foils.

Preferably, a first set of conductors in said grid serve as transmitter conductors to transmit signals tuned to cause resonance in a correspondingly tuned physical object, and a second set of conductors serve as receivers of resonance signals from a closely located physical object, thereby enabling said device to locate a physical object.

Preferably, said first set of conductors is embedded in a first transparent foil and said second set of conductors is embedded in a second transparent foil.

In a particularly preferred embodiment, there is provided at least one electro-optic sensor for detecting the position of at least one of said foils on said graphic display device.

A preferred embodiment further has a coil surrounding said graphic display device, said coil being operable to transmit a signal able to cause resonance in a physical object, said grid being operable to pick up said resonance via conductors close to said resonating physical object and thereby to locate said physical object.

Preferably, said signal is able to cause resonance in physical objects having a range of resonant frequencies.

Preferably, the signal is a wide band signal.

Preferably, the signal comprises a train of short pulses.

Preferably, the signal comprises a series of frequencies corresponding to resonant frequencies of said identifiers of respective objects in said set.

Preferably, said electronic processing comprises identifying frequencies appearing on individual conductors of said grid following the issuance of said signal.

Preferably, said electronic processing comprises a fast Fourier transform.

Alternatively, given that the frequencies of said physical objects are known, said electronic processing comprises frequency correlation.

In an embodiment there are provided unique storage positions for each physical object.

In a preferred embodiment there is provided a set of physical objects to be detected, the device comprising device following functionality, operable to infer from knowledge of a previous position of a first physical object, knowledge of at least one rule for moving said physical object, and a detected position of said set of physical objects following a move, the current position of said first physical object.

An embodiment provides at least one sensible die for selecting a score based on its orientation, wherein said detector is operable to determine the orientation of said die, said device thereby being operable to deduce said score.

Preferably, said sensible die comprises a plurality of resonant circuits each one being associated with a different orientation of said die and being activated when said die is in the respective orientation, and wherein said detector is operable to detect said resonant frequency.

Preferably, said sensible die comprises a weighted switch for selecting between said resonant circuits based on said orientation of said die.

An embodiment may be used in association with a game utilizing at least one die. In the embodiment, the device comprises a score deducer for deducing a score shown by said at least one die from a detected move of said objects.

A preferred embodiment comprises an interface module for interfacing with the detector.

In a preferred embodiment, said interface module is part of an operating system.

According to a third aspect of the invention there is provided a sensible die for use with an electronic game platform, said die having a plurality of orientations and a score associated with each orientation, the die comprising a plurality of signal generating circuits each one being associated with one of said orientations of said die and being selectable for signal generation when said die is in the respective orientation.

In a preferred embodiment the die comprises a weighted switch for selecting between said signal generating circuits based on said orientation of said die and thereby associating each one of said signal generating circuits with a respective orientation.

Preferably, said signal generating circuits are resonant circuits.

Preferably, each said resonant circuit is operable to resonate at a different frequency, thereby indicating said orientation of said die.

BRIEF DESCRIPTION OF THE DRAWINGS

For a better understanding of the invention and to show how the same may be carried into effect, reference will now be made, purely by way of example, to the accompanying drawings, in which:

FIGS. 7 and 8 are schematic diagrams showing first and second transparent foils for placing on a game board in accordance with embodiments of the present invention, FIG. 12 is a generalized diagram showing an electronic game board according to a third embodiment of the present invention, FIG. 13 is a generalized schematic diagram illustrating the detection of a single token according to the third embodiment of the present invention.

DETAILED DESCRIPTION OF THE PREFERRED EMBODIMENTS

In general, embodiments of the present invention provide a game-play system comprising an electronic flat panel display screen, sensible playing pieces or game token a computerized controller and a location and identification system. The playing tokens are preferably provided as a set, the set being suitable for providing all the tokens necessary for the maximum number of sides in a game. Each of the tokens is preferably separately identifiable.

The tokens or game pieces may be figures having a meaning in relation to the game, such as in chess, or they may simply indicate a player's position such as in Monopoly™, any distinctiveness in the pointers being simply to distinguish one player from another. Alternatively, the pieces may be pointers or styluses.

The game permits play between any combination of local human players, remote human players, local artificial players and remote artificial players. The robot arm preferably moves pieces on behalf of either remote or artificial players.

Figure 21:
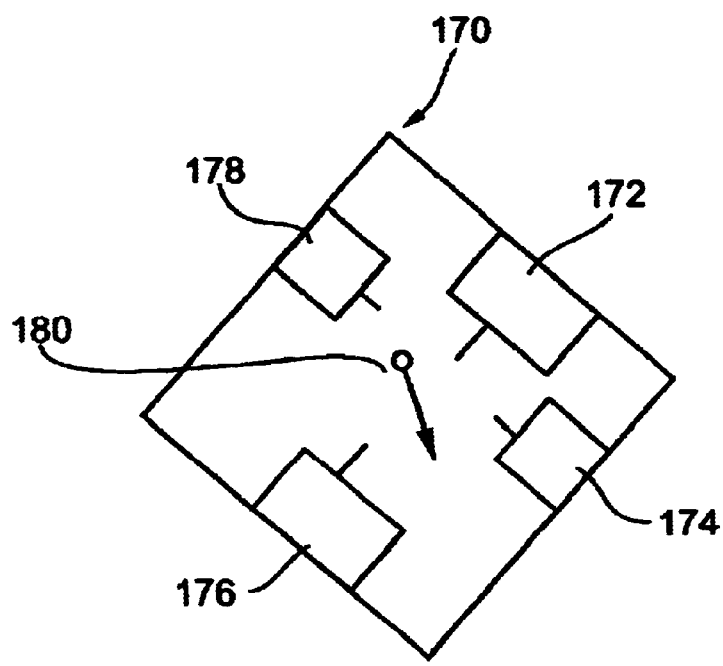
FIG. 21 is a generalized diagram showing a sensible die operable in accordance with embodiments of the present invention.
Figure 22:
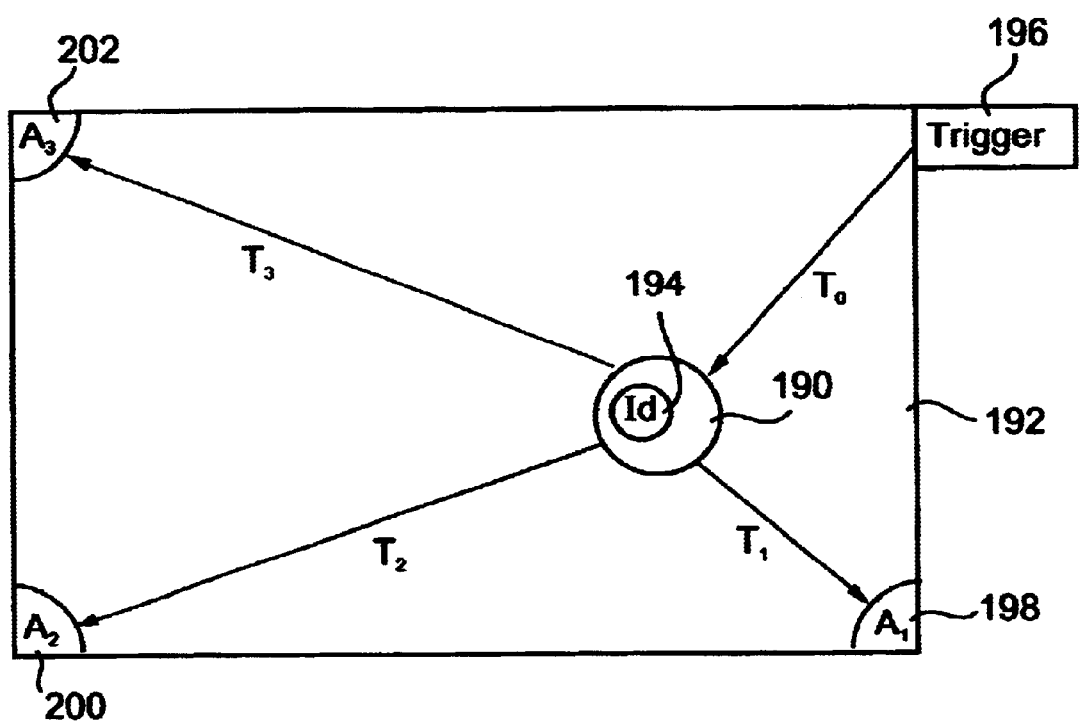
FIG. 22 is a simplified diagram showing a further preferred embodiment of the present invention in which the location of a token on a playing surface is calculated from differences in the signal received at each of a plurality of receivers.

In the following description, FIGS. 17 to 20 describe the game-play system at die system level. FIGS. 1–6 show an embodiment using visual detection. FIGS. 7–11 show a first embodiment using inductive detection and FIGS. 12–16 show a second embodiment using inductive detection. FIG. 21 describes a die for use in connection with such a system and FIG. 22 shows another embodiment of a sensing systems.

Figure 1:
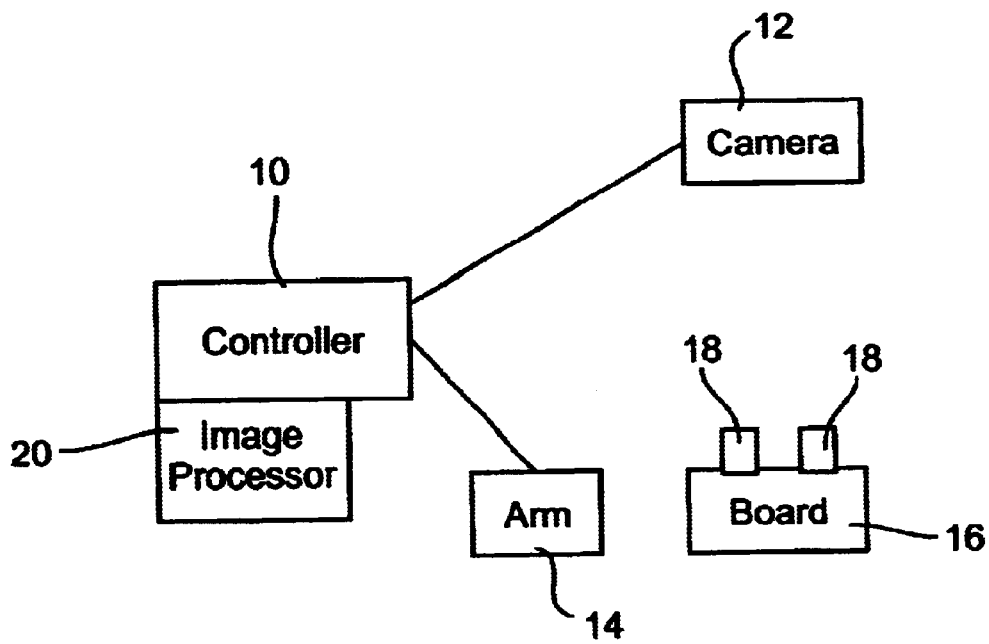
FIG. 1 is a block diagram showing a generalized system according to a first embodiment of the present invention.

Reference is now made to FIG. 1, which is a general block diagram of a first embodiment of the present invention. In FIG. 1, a controller, 10, which may typically be a general-purpose computer, is connected to a camera 12 and a robot arm 14.

As will be explained in more detail below, the purpose of the camera is to produce images of a board 10 comprising playing pieces 18. The images are used to locate and identify the different playing pieces 19 on the board 16. The playing pieces may be moved either by a player or by the robot arm 14.

In one embodiment, the board 16 is any standard game board. However, in a preferred embodiment, the board is a flat screen on which different or changing images can be projected.

In order to identify and locate the different playing pieces 18, the controller 10 may further comprise an image processor 20, preferably in the form of software, to process the image received from camera 12. In a game, individual playing pieces are often very similar, especially to the eyes of an image processing program. Thus visual detection of playing pieces has not been used until now, apparently because image processing is not currently able to distinguish in a reliable manner between playing pieces that may typically he used together in a game.

Figures 2A, 2B, 2C:
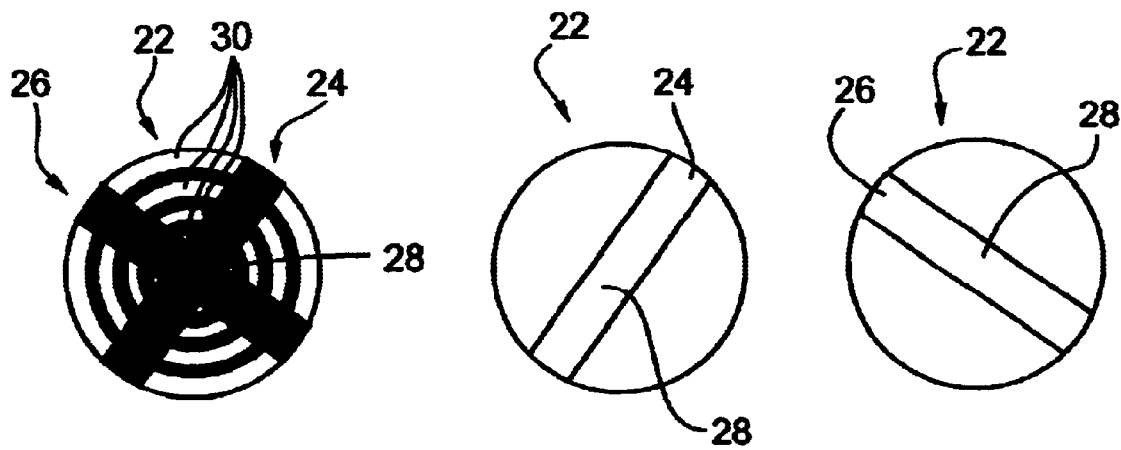
FIGS. 2a to 2c are generalized diagrams showing visual indicators placed on tokens to enable visual detection according to one embodiment of the present invention.

Preference is now made to FIG. 2A which is a generalized diagram of a visual pattern 22 which is preferably placed on each of the playing pieces 18. The pattern 22 is preferably selected for compatibility with the image processor 20 and the skilled person will be aware that the image shown is not the only suitable image. The visual pattern is chosen for being identifiable by image processing.

The pattern 22 is preferably applied to an upwardly facing flat horizontal surface of the playing piece.

The pattern comprises a first stripe 24 of a first color, and a second stripe 26 of a second color, both stripes having a center of gravity 28 at the center of the playing piece. The stripes 24 and 26 are angularly spaced from each other and may typically form a cross or an X. A number of concentric rings 30, alternating between a third and a fourth color surround the center of gravity.

The stripes 24 and 26 are preferably identical over all of the playing pieces. The concentric rings 30, however, differ between the playing pieces and indicate a piece code, color or other pertinent information.

Reference is now made to FIG. 2B, which is a generalized image of the pattern 22 seen through a first filter arranged such that the first stripe 24 only is seen through the filter.

Reference is now made to FIG. 2C, which is a generalized image of the pattern 22 seen through a second filter arranged such that only the second stripe 26 is visible. It will be noticed that the region 28, indicating the center of gravity of each of image stripes 24 and 26 is blank. This does not however interfere from the ability of an image processing algorithm to detect it as the center of gravity of the second stripe 26.

Figure 2D:
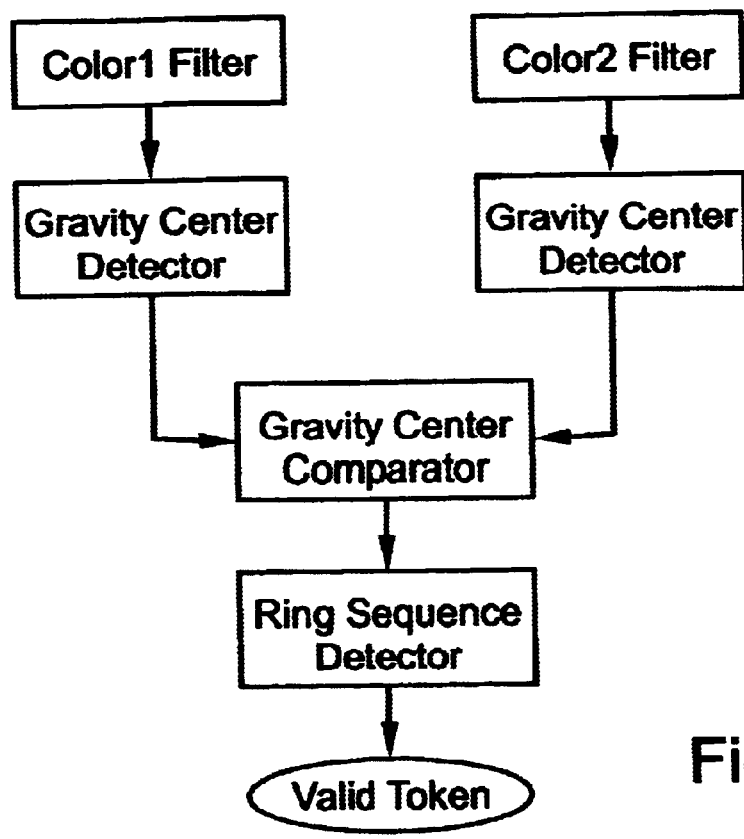
FIG. 2d is a generalized flow chart showing a procedure for detection using the indicators of FIGS. 2a to 2c.

Reference is now made to FIG. 2d, which is a simplified flow chart showing the image recognition procedure. An image is produced using each one of the color filters. Typically images of the types shown in FIGS. 2b and 2c are formed, each of which includes a diagonal stripe. Then a center of gravity is determined using a suitable algorithm for each of the diagonal stripes. The centers of gravity for each of the two images should coincide if the correct center of gravity has been identified in each case and thus a comparison step is carried out to compare the two centers of gravity. If the two centers of gravity are found to be the same, or within a small margin of error of each other, then the center of gravity is accepted and the ring sequence is looked at. Differences in the ring sequence between different tokens in the set may be used to identify the individual token. The token identity and position may then be validated.

Figure 3:
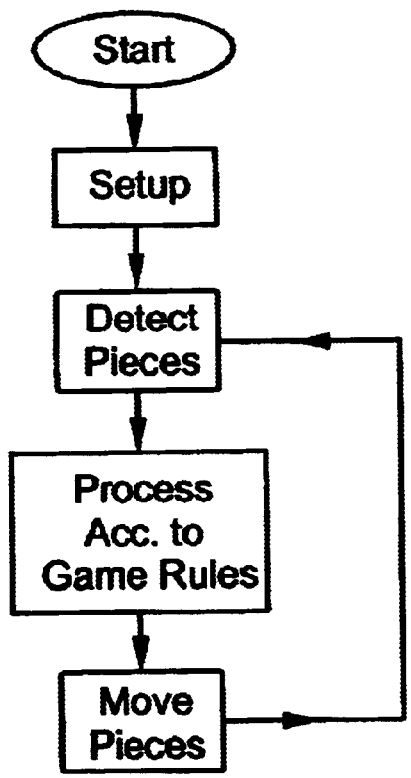
FIG. 3 is a generalized flow chart showing how detection systems may be incorporated into gameplay.

Reference is now made to FIG. 3, which is a generalized flow diagram showing operation of an embodiment of the present invention.

In FIG. 3, operation of the embodiment comprises a setup phase. In this embodiment, the position of the camera 12 is not fixed relative to the board. Thus, it is necessary for the camera 12 to obtain information as to their relative positioning and this is carried out in a setup phase. The purpose of such a setup phase is to find and calibrate the position of the camera 12 relative to the board 16. The setup phase preferably works in the background and is carried out at the beginning and at regular intervals during the game.

During setup, the board 16, which in one embodiment is a graphic display device such as an LCD flat screen, displays predetermined patterns at a series of preselected locations. The screen display is monitored by the camera 12 and the patterns at the preselected locations are detected by the image processor 20. The preselected locations being known, a transformation matrix is constructed to allow points in an image formed by camera 12 to be interpreted as specific locations on the board 16.

Following the setup phase, the device moves into a working mode. The working mode comprises steps of detecting pieces, processing according to the same rules and moving the pieces. The moving of pieces is carried out by sending a robot arm to the identified location of the piece, carrying out a pick operation to grab the piece, lifting the piece, moving the piece to the desired new location and placing the piece on the flat surface.

Generally, in a game, there is a human player who must also be permitted a turn to move a piece. The detection system leaves the human player to carry out his move and then redetects the pieces to find out what the human player has done. The move is then checked for legality and, if the computer is satisfied that the move was in accordance with the rules then the game is continued with.

Figure 4:
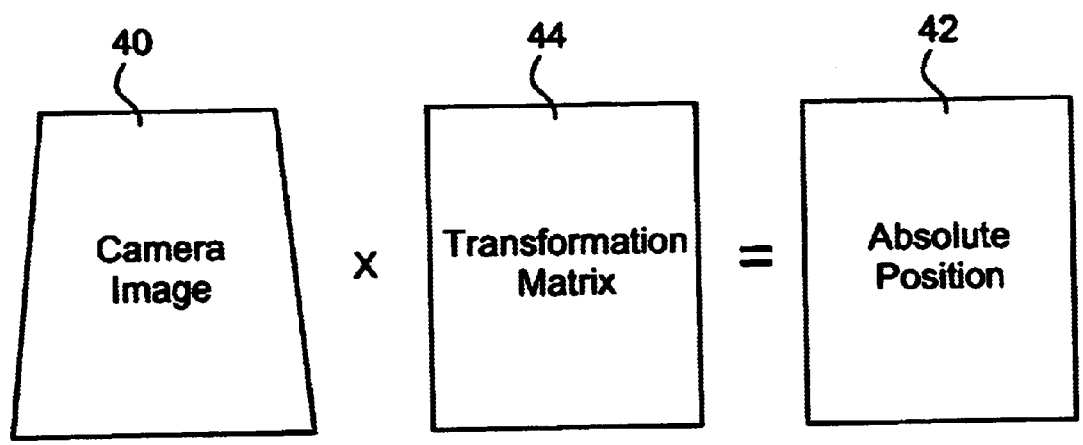
FIG. 4 is a generalized block diagram illustrating the means of calibrating a camera for visual detection.

Reference is now made to FIG. 4 which is a simplified block diagram showing in further detail how the detection step is carried out. The camera 12 has a view of the board 16 which is influenced by the relative positions of the board and the camera and may typically be in the form of a trapezium. Thus, as explained above in reference to the setup phase, in order to translate between the camera image positions and absolute coordinate positions 42 on the playing surface or board 16, a transformation matrix 44 is constructed, which simply contains multipliers for different board positions. The transformation matrix 44 is preferably empirically arrived at during the setup phase. Subsequently, pieces are detected in the camera image at particular image co-ordinates, and the co-ordinates are multiplied by the corresponding entry in the transformation matrix to produce an absolute position of the pieces on the board 16.

Figure 5:
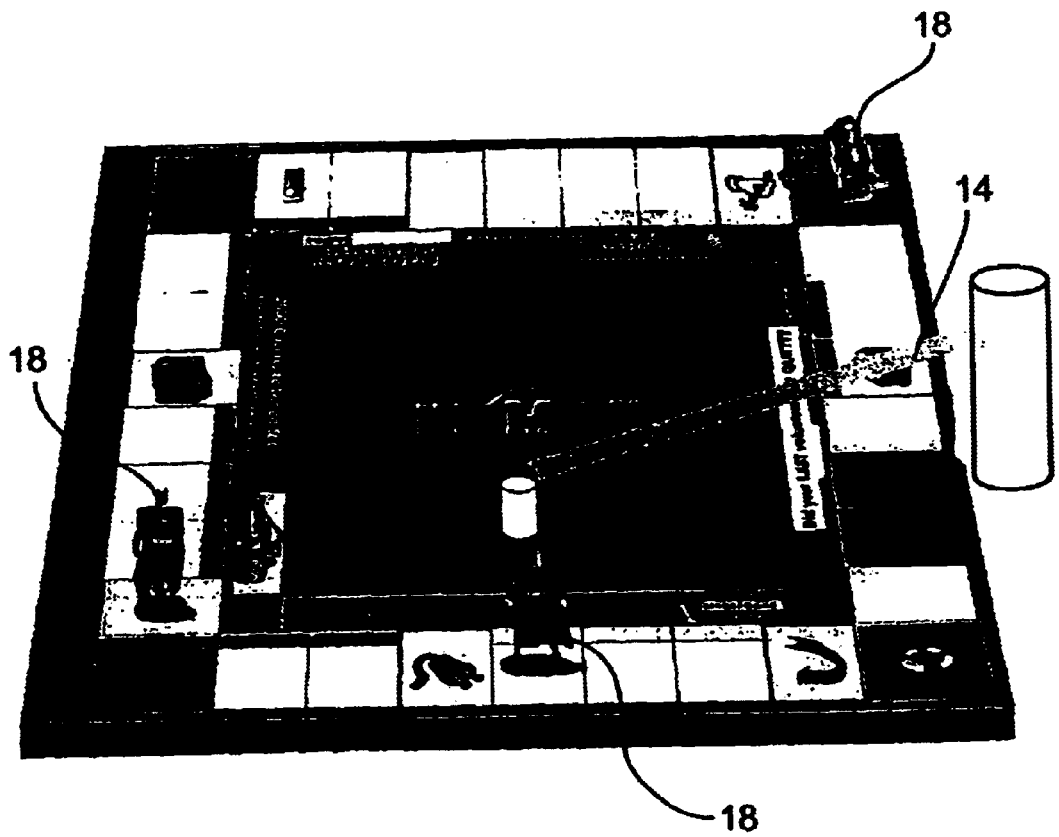
FIG. 5 is a generalized diagram showing a game board having playing pieces, usable in accordance with embodiments of the present invention.

Reference is now made to FIG. 5, which is a generalized schematic upper perspective view of a game board according to an embodiment of the present invention. The upper perspective view is a typical view that a camera 12 may have of a game board. Playing pieces 18 are arranged at various locations around the board 16. When the location of the pieces has been determined by the camera 14, the pieces may be moved by the robot arm 14 or by a human player (not shown).

Figure 6:
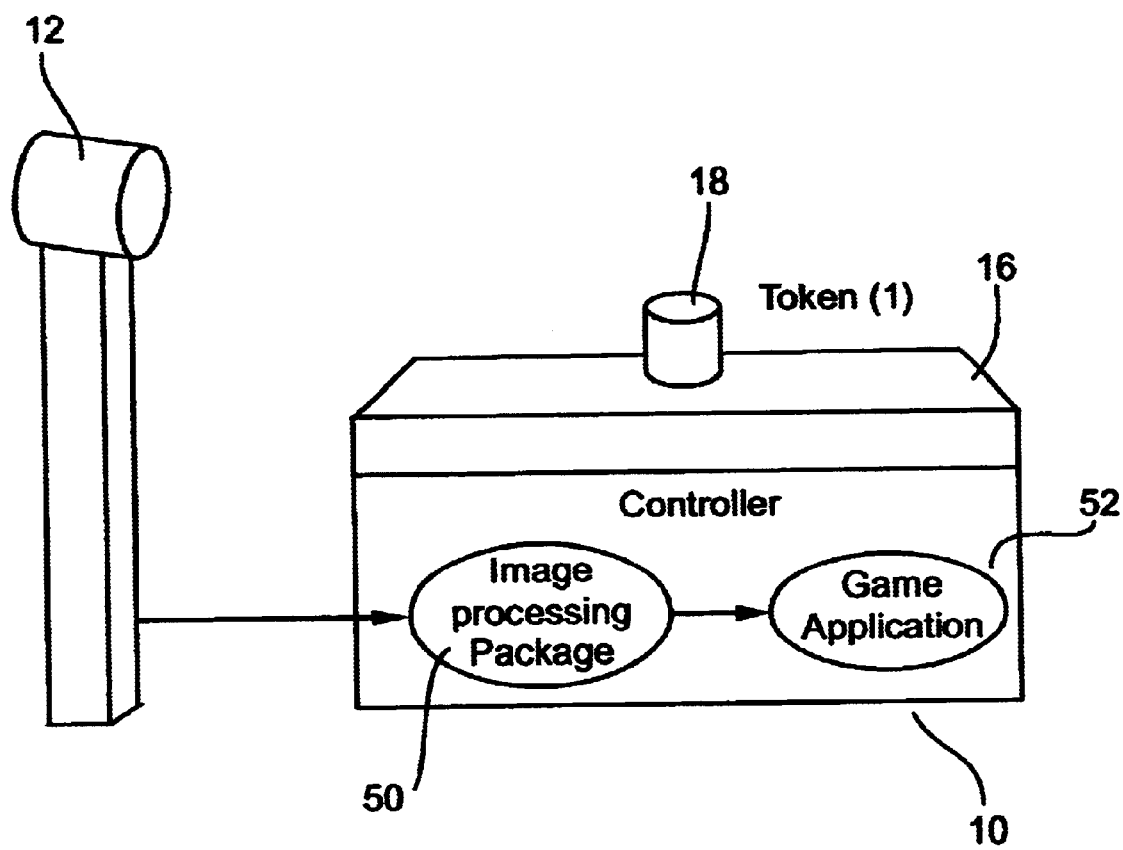
FIG. 6 is a block diagram showing elements of a game playing system in accordance with an embodiment of the present invention.

Reference is now made to FIG. 6, which is a generalized schematic diagram of a device according to the present invention showing inter alia how the camera 12 may be sited in order to give an image of the type shown in FIG. 4. Parts that are identical to those shown above are given the same reference numerals and are not referred to again except as necessary for an understanding of the present embodiment. The camera 12 is sited above and to one side of the board 16, which in this case is shown as a flat screen LCD display. The controller 10, which may be a CPU, is shown as built in beneath the screen 16.

The controller 10 preferably comprises two principle software items, an image processing package 50 which identifies the visual patterns or markers of FIG. 2 and also carries out the image transformation, and a game application 52 which knows about the layout of the board and permitted and forbidden rules and which keeps track of the playing pieces, decides whether human moves are legal or not and calculates its own moves as a player.

In the above described embodiment, the recognition system is able to identify the individual playing piece from analyzing the rings in the visual patterns or markets in an alternative embodiment the identity of each piece is known at the start of the game. Each move is made in accordance with a set of rules and furthermore each move generally involves a single piece being moved from a current position in a predictable manner either to a currently vacant position or, depending on the nature of the game, to a position currently held by an opposing piece which is captured. Thus the game application 52 is able to keep track of individual pieces simply by comparing old and new detected positions and using the game rules.

Reference is now made to FIG. 7, which illustrates a first transparent foil 60 operable in conjunction with a second embodiment of the present invention. In the second embodiment, a series of single loop coils 62.1 . . . 62.n are formed on one surface thereof by coating with conductive film and etching. Alternatively, ultra-thin wires could be attached to the film to form the conductors. The single loop coils 62.1 . . . 62.n are all elongated in a parallel direction.

Although the coils are shown and referred to as single loop coils, multiple loop coils could also be used.

Reference is now made to FIG. 8, which illustrates a second transparent foil 64, operable in conjunction with the second embodiment of the present invention. The second transparent foil 64 likewise has a series of single coil inductors 66.1 . . . 66.n etched thereon, all elongated in a parallel direction but at right angles to the elongated direction of the first transparent foil 60.

Figure 9:
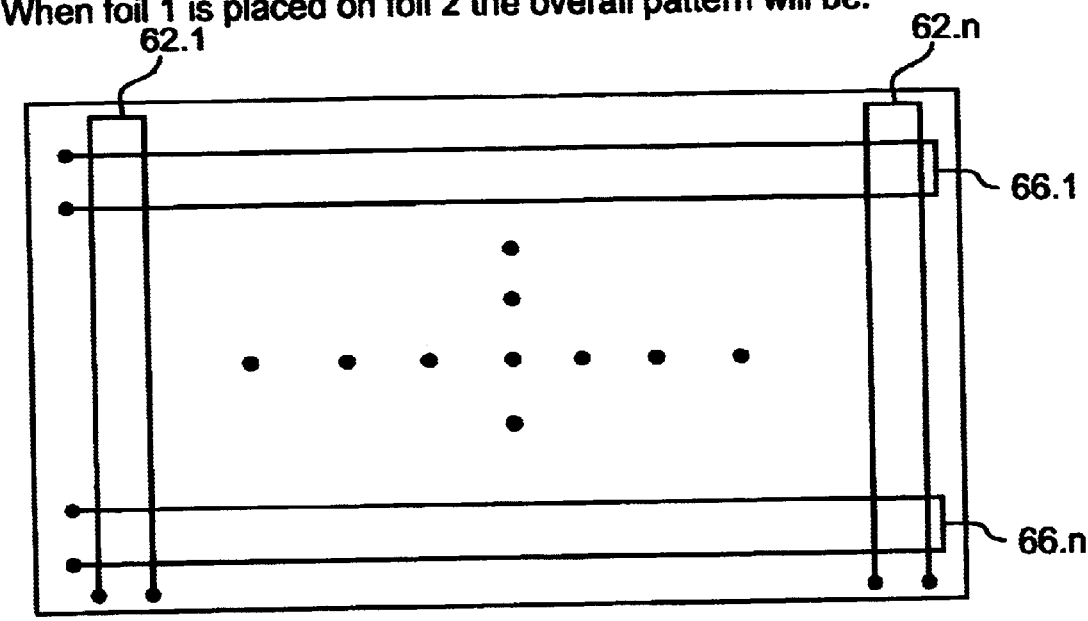
FIG. 9 is a schematic diagram showing the superposition of the foils of FIGS. 7 and 8.

Reference is now made to FIG. 9 which shows the first 60 and second 64 transparent foils superimposed one upon the other. The foils 60 and 64 are so oriented that the respective inductive coils 62 and 66 are at right angles. The inductive coils define co-ordinates over a surface to which the superimposed coils are applied and a mutual inductance exists at each junction between each pair of coils. The mutual inductance is generally relatively low but will be enhanced if a playing piece itself including an inductance is placed over the junction. If the playing piece itself has a resonance circuit and is excited to its resonant frequency then the mutual inductance is raised significantly and the co-ordinates of the playing piece can be ascertained. Furthermore, if the playing piece has a unique resonant frequency then the piece call not only be located but can also be positively identified.

As described above the mutually perpendicular inductive coils are placed on separate transparent foils. The skilled person will be aware that this is to ensure that there is no conductance therebetween and it is possible, as an alternative, to provide the mutually perpendicular coils on opposite surfaces of the same film or in any other mutual arrangement that reliably prevents conduction therebetween.

Figure 10:
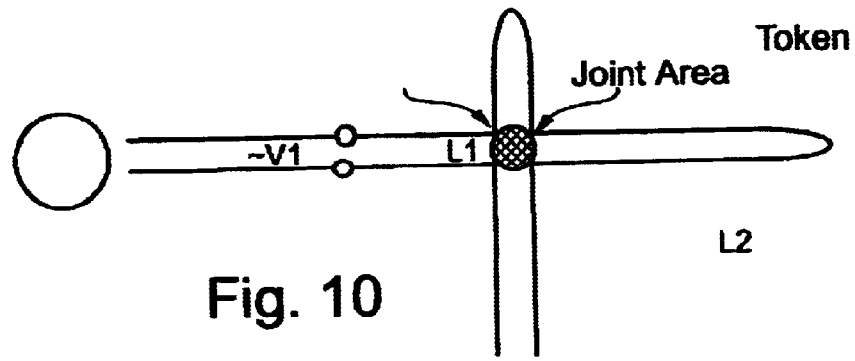
FIG. 10 is a schematic diagram illustrating the detection of a single token in accordance with an embodiment of the present invention.

Reference is now made to FIG. 10, which shows a junction between two single coil inductors. A playing piece 68 having a resonant frequency f1, lies over the junction and thus increases the mutual inductance between the two conductors. If a signal is passed through the horizontal conductor at frequency f1, this will cause the playing piece 68 to resonate and thus the mutual inductance between the two inductive coils is increased even further. The current obtained from the second coil is thus indicative of the presence of a piece having resonant frequency f1 at the junction with the coil currently being energized.

The alignment between the foils and the screen may not be precise. Thus an alignment compensation procedure is used. The procedure uses a compensation factor with is determined as follows:

A visual signal, such as pixels at a certain location blinking at a certain rate is given out at the board 80. The signal is moved around different pixels until it is detected by a photodetector mounted on the playing piece 68. The photodetector only correctly identifies the blinking pattern if the pattern is centered on pixels directly underneath the photodetector. The system is able to infer from the pixels to which the signal was applied at the time the photodetector indicated detection, what the correction factor should be.

Figure 11:
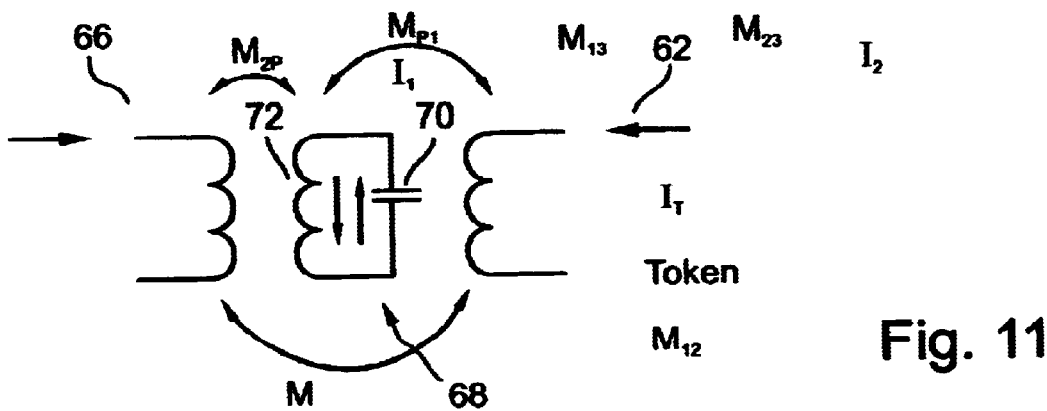
FIG. 11 is a schematic diagram indicating magnetic flux between a token and inductive coils.

Reference is now made to FIG. 11, which is a simplified circuit diagram showing in a schematic manner the situation at the junction shown in FIG. 10. At the junction, the two coils 62 and 66 have a mutual capacitance $M_1$ which is independent of the presence of the playing piece 68. In addition there is a mutual capacitance $M_{1p}$ between the first coil and the playing piece and there is a mutual capacitance $M_{2p}$ between the playing piece and the second coil. The playing piece 68 comprises a resonant circuit which may include a capacitor 70 and an inductor 72. $M_{1p}$ and $M_{2p}$ are not constant but rather increase considerably when the resonant circuit is at resonance.

The playing pieces 68 receive their power by inductive coupling and thus may be entirely passive electronic devices, That is to say they need not contain batteries or any other active electronics. They are simply required to resonate when exposed to a suitable frequency. The number of playing pieces 68 that can be incorporated into a game is simply the number of discrete frequencies that can be detected by the coil arrangement. For practical purposes it is unbounded.

In use one of the sets of coils, either horizontal or vertical, is excited directly, with the excitation frequency f1 of one of the playing pieces it is desired to locate. The various coils in the set are excited either altogether or one after the other and if the relevant playing piece is present at one of the junctions then the corresponding coil from the other set gives a relatively strong signal.

In one embodiment, each coil of one set is excited successively with all of the frequencies corresponding to pieces being used and then the same is done with each other coil, thus locating every piece in a single scan. Alternatively, a single frequency is used to mite each of the coils of one set until a corresponding piece is found and then further scans are made with other frequencies.

In greater detail, the first set of coils excite alternating magnetic flux therewithin. The second group is used to read out alternating voltage signals coupled between the two groups of loop coins. The playing pieces or tokens preferably consist of LC resonant circuits, as described above, wherein each token is tuned to a predetermined resonant frequency which is distinct from a resonant frequency of other tokens within the playing set in term of the resolution of the system. The coupling efficiency between any coil in the first set and any coil in the second set is generally very low. In the event that a token is placed in the junction area of two coils, a shown in FIG. 10, the effective mutual inductance between the two coils is dramatically increased. A large amplitude at the output of the reading coil is created if the token is excited to resonance.

By Successive excitation of each one of the coils in the first group in all predetermined frequencies while reading voltages developed on each one of the coils of the second group, the position and the identification of all of the tokens in a playing set may be determined.

Digital or analog communication between the systems and a token may be accomplished by appropriate modulation of the exciting signal at the resonant frequency of the token. Energy transfer to the token may be established by increasing the current carrying capacity of the token in its resonant or coupled state and the exciting coil. The energy thus transferred may power electronic circuitry performing various functions within the token, such as data transfer or actuation.

Voltage signals from the reading coil are preferably detected coherently with the exciting signals to enable error-free detection. Thus a phase detector and a low pass filter may be sufficient to eliminate unwanted signals.

Reference is now made to FIG. 12, which is a simplified diagram of an electronic game board 80 for use with a further embodiment of the present invention. The electronic game board may typically be a flat screen display as in previous embodiments. As in the embodiment of FIGS. 7–11, two transparent foils 60 and 64 are placed on the board surface and have conductors etched thereon to form two sets of single loop coils. More specifically, as described above in respect of FIGS. 7 and 8, a series of single loop coils 62.1 ... 62.n are formed on one surface thereof by etching. The single loop coils 62.1 ... 62.n are all elongated in a parallel direction. The second transparent foil 64 likewise has a series of single coil inductors 66.1 ... 66.n etched thereon, all elongated in a parallel direction but the two foils 60 and 64 are superimposed such that the elongated direction on one is at right angles to the elongated direction of the other. The two sets of coils provide x-y co-ordinates to identify the location of a token as in the previous embodiment but, contrary to the previous embodiment, both sets of coils only receive signals and do not transmit.

Instead, in the embodiment of FIG. 12, transmission is provided by an excitation coil 82 which is wound around the periphery of the game board 80. The excitation coil 82 produces a series of pulses. The pulses may be of wide spectrum or the series may comprise a combination of one or more frequencies of the resonant circuits. A way of achieving wide spectrum pulses is by using square wave pulses of short duration which, as shown by Fourier theory, comprise a long series of ever decreasing amplitude, increasing wavelength sine waves. Each one of the set of tokens 18 is resonant at a different frequency, as in the previous embodiment and, in response to the pulse, resonates at its own frequency. The resonance induced in the token 18 is transmitted to the corresponding horizontal and vertical coils over which the token is placed and simple wavelength filtering of the signals received at the output of each coil allows a co-ordinate to be determined for each token corresponding to a wavelength detected.

Also in FIG. 12 there is shown a photodetector 69 mounted on the superimposed foils. The superimposed foils are mounted on the electronic game board 80 to detect tokens as described above. The foils may however not be exactly placed on the board 80 and the photodetector 69 is used to calculate a compensation factor so that co-ordinates determined using the foils can be translated into positions on the board. Determination of the compensation factor is as follows:

A visual signal, such as pixels at a certain location blinking at a certain rate is given out at the board 80. The signal is moved around different pixels until it is detected by the photodetector 69. The photodetector only correctly identifies the blinking pattern if the pattern is centered on pixels directly underneath the photodetector. The system is able to infer from the pixels to which the signal was applied at the time the photodetector indicated detection, what the correction factor should be.

Reference is now made to FIG. 13, which is a simplified diagram showing a single token 18 placed at the junction between two read coils 62 and 66 on an electronic game board 80 within a peripheral excitation coil 82. An effective mutual inductance exists between the token and the two coils 62 and 66. A pulse generator 84 excites the excitation coil 82 with a series of pulses as described above, which are picked up by the resonant circuit (FIG. 14) of the token 18. The token 18 is caused to resonate at its resonant frequency, as described above, and a small voltage amplitude oscillation induced in the resonant circuit is picked up by each of the coils 62 and 66. A real time analysis function determines the frequencies on the individual coils and thus the X-Y co-ordinates and the identity of the token may be determined.

Figure 14:
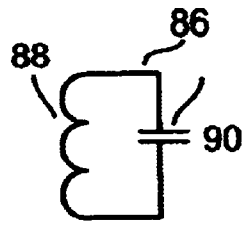
FIG. 14 is a generalized diagram showing internal circuitry of a token for use in accordance with the third embodiment of the present invention.

Reference is briefly made to FIG. 14 which shows a typical resonant circuit 86 comprising an inductor and a capacitor, that may typically be used in a token 18. The circuit 86 is a typical tank circuit and comprises an inductor 88 and a capacitor 90. The circuit is typically passive, that is to say, it is not internally powered.

As in the previous embodiment, energy induced in the circuit 86 may be used to power actuators or signal lights or other devices on the token, and data can be modulated onto the resonant frequency to communicate with the token, for example to signal it to switch on an LED at a particular gage in the game.

EXAMPLE OF THE DETECTION OF THREE TOKENS

The use of the embodiment for detecting a plurality of tokens will now be illustrated with the following tabular example.

Suppose that three tokens are placed on the transparent plane with a grid of 5×5 at the following coordinates, each token having a different resonant frequency is shown.

TABLE 1

3 Token Example

| Token | X-coordinate | Y-coordinate | Resonance frequency (Hz) |
|---|---|---|---|
| 1 | 1 | 3 | 1000 |
| 2 | 4 | 3 | 2000 |
| 3 | 5 | 5 | 3000 |

After excitation using a wide spectrum pulse the system simultaneously reads all signals from all the coils and analysis may detect the following signal frequencies.

TABLE 2

Detection of Tokens in Table 1.

| No. | X-coordinate (Hz) | Y-coordinate (Hz) |
|---|---|---|
| 1 | 1000 | 0 |
| 2 | 0 | 0 |
| 3 | 0 | 1000 + 2000 |
| 4 | 2000 | 0 |
| 5 | 3000 | 3000 |

Since 1000 Hz is detected at coils corresponding to X1 and Y3, the program concludes that token 1 is placed on (1,3).

Since 2000 Hz is detected at coils corresponding to X4 and Y3, the program concludes that token 2 is placed on (4,3).

Since 3000 Hz is detected at coils corresponding to X5 and Y5, the program concludes that token 3 is placed on (5,5).

Because each token has a different resonant frequency, coupling between tokens is avoided. The voltage signals of different tokens may share a common detection coil as for example Y3 in the example above, but the signals can be separated by simple filtering.

In the above example, a single pulse is applied and all coils producing a response are detected simultaneously by filtering for all of the frequencies in use by tokens in the game. It is also possible to detect individual tokens separately, thus simplifying the control circuitry but slowing down operation.

Figure 15:
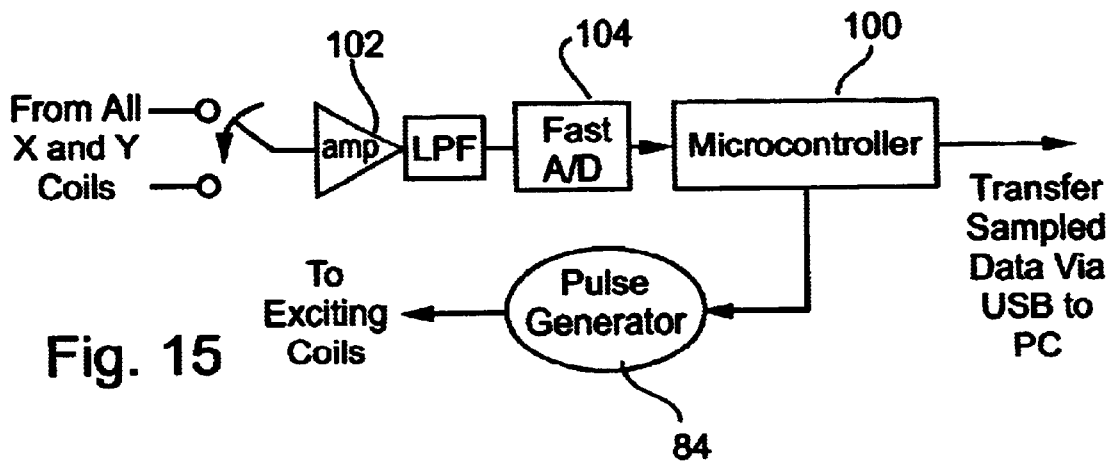
FIG. 15 is a generalized circuit diagram illustrating circuitry for detecting the position of tokens of a gameboard in accordance with the third embodiment of the present invention.

Reference is now made to FIG. 15 which is a simplified electronic block diagram of circuitry for use in the detection system of the present invention. In FIG. 15 a microcontroller 100 produces a signal as described above which operates the pulse generator 84 to produce a wide spectrum pulse which induces it high level of flux over the area of the game board 80. As described above this induces resonance in a series of tokens is located around the board and this induces detectable signals at corresponding wavelengths in the coils 62, 66.

The signals received at the outputs of the coils are amplified by an amplifier low pass filter 102 and then passed on to a fast A/D converter 104. The microprocessor 100 then carries out digital filtering to determine the locations of the pieces. The data may then be transferred to a general purpose computer. Alternatively, the microprocessor 100 may pass the signals to a further microprocessor to carry out FFT.

Preferably, after the signal is output to the surrounding coil 82, the system waits for several microseconds. Then the signals received at the reading coil outputs are digitized by the fast A/D converter 104 and sent to the microprocessor 100. The microprocessor preferably performs a fast Fourier transform (FFT) on the output of each cod to indicate the frequencies present and from this it is able to determine the location and identity of each token as described above.

In an alternative embodiment, since all of the frequencies are known, instead of using FFT, a correlation algorithm is used on each input to identify the frequencies present. For a small number of tokens, the correlation algorithm is faster.

If a token 18 is not placed directly over a junction but is in between two X coils or two Y coils or both, then instead of receiving a strong signal at one output, weaker signals are received at at least two outputs. The relative strengths of the two signals may indicate where the token is between the coils, and the microprocessor 100 may thus use a simple interpolation algorithm to determine more accurately the location of the token 18.

Figure 16A:
FIGS. 16a and 16b are generalized waveform timing diagrams showing an excitation signal and a corresponding detection signal in accordance with the third embodiment of the present invention.
Figure 16B:
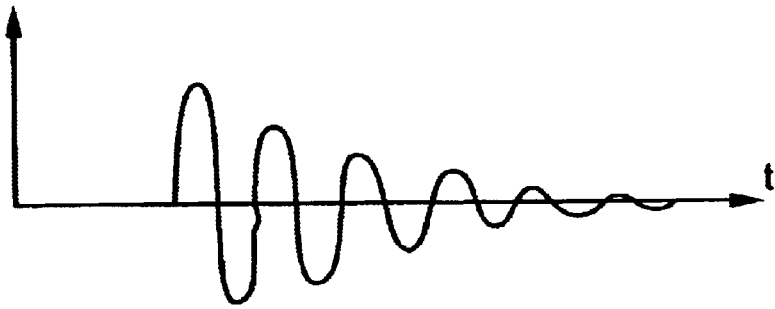

Reference is now made to FIGS. 16a and 16b which show respectively a typical exciting pulse as output on the peripheral exciting coil 82 and a corresponding diminishing resonance signal as detected at the outputs of the reading, coils 62 and 66. The two figures are juxtaposed to show a timing relationship between the two signals.

An outer coil was placed around the game board area. When a pulse was applied, the LC circuits inside the tokens stared to oscillate at exactly the resonant frequencies, and signals could be detected at the readout coils at the same frequency after amplification. No interference between the tokens was detected. When the two tokens were placed on the same columns or rows, two frequencies identical to the resonance frequencies of each token could be read.

Figure 17:
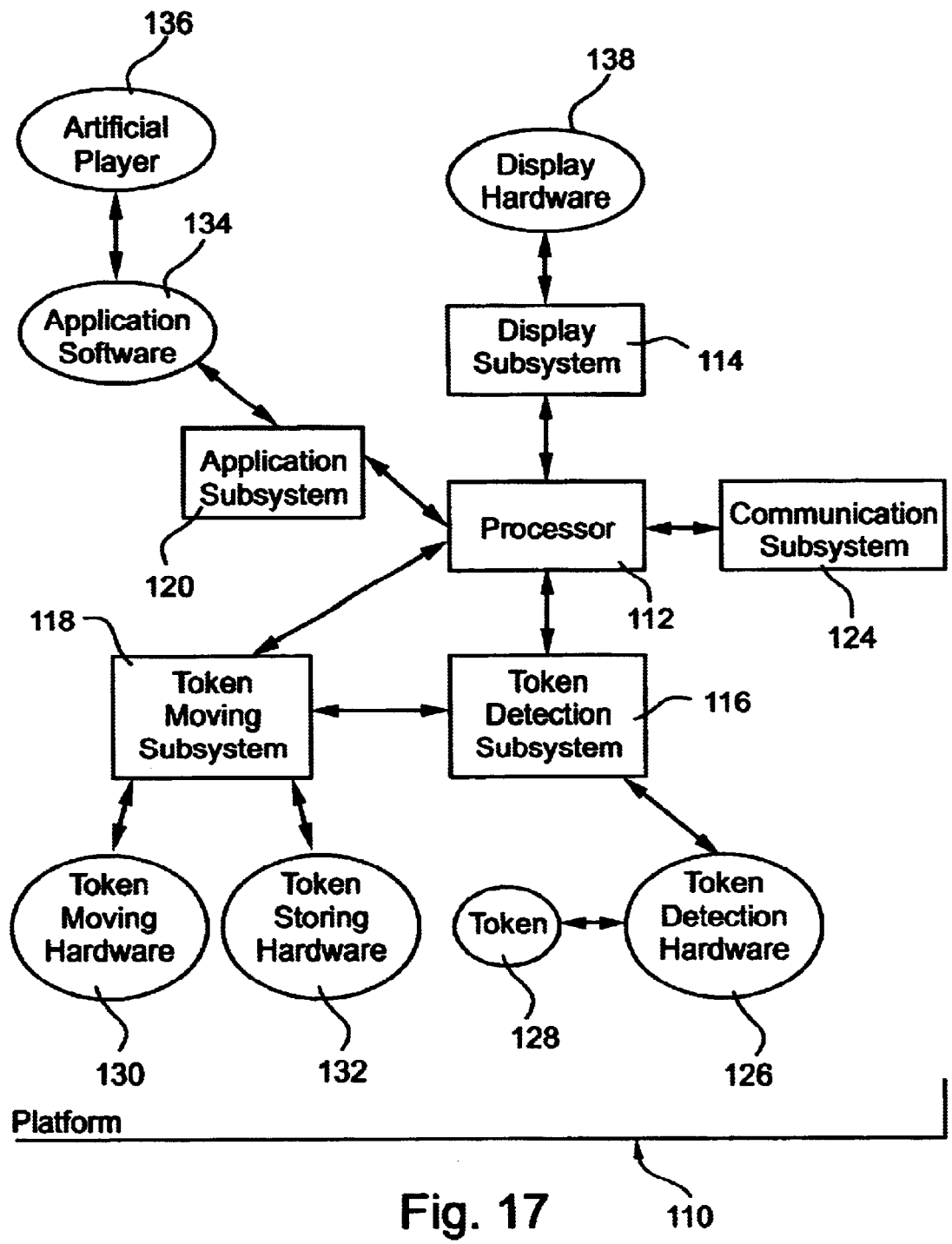
FIG. 17 is a generalized block diagram at the system level for a platform for games or simulations.

The above-described induction-based embodiments for detection of tokens may be applied to a game platform similar to that shown in FIG. 1. Reference is now made to FIG. 17 which is a system level block diagram of a game platform to which any one of the above-described embodiments may be applied, In FIG. 17 a game platform 110 comprises a central processor 112. The central processor 112 has a display subsystem 114, a taken detection subsystem 116, a token moving subsystem 118, an application subsystem 120, and a communication subsystem 124.

The token detection subsystem 116 computes any one of the embodiments described above with respect to FIGS. 1 to 16. The subsystem 116 is associated with token detection hardware 126 which may be a camera or may be one of the arrangements of inductive coils discussed above. The subsystem is also associated with tokens 128 which are compatible with the token detection hardware, again as described above. The subsystem 116 also preferably includes a dynamic database that stores the current positions and other relevant information about the tokens.

The token moving subsystem 118 provides an interface to the central processor 112 for token moving hardware 130 and token storing hardware 132 if provided. The token moving hardware 130 is preferably the robot arm 14 of FIG. 1. The token storing hardware 132 may typically be a storage tray for storing tokens not currently in use in the game and it will be discussed in further detail in respect of FIG. 19 below.

The application subsystem 120 supports application software 134, typically software defining the game being played and permissible moves, and any artificial players, such as artificial player 136 and the like. The subsystem is preferably game independent and provides an interface between the games and the operating system and the remaining subsystems.

The display subsystem 114 allows a gameboard to be displayed on display hardware 138 such as electronic game board or flat screen display 80. The display hardware 138 is preferably a flat panel display that can be placed horizontally. The display hardware preferably comprises full multimedia capability, text, picture, sound, animation video etc.

The communication subsystem allows the processor to receive input from other players over a network such as the Internet and to send output to the same. The communication subsystem is linked with the other subsystems so that such a player can be represented on the platform 110 by tokens 128 being moved by the token moving hardware 130. the system may be designed with a separate interface module, which is responsible for communication between the detection subsystem 116 and the application subsystem 120. The interface module may be implemented as part of the system or it may be integrated with the operating system.

Figure 18:
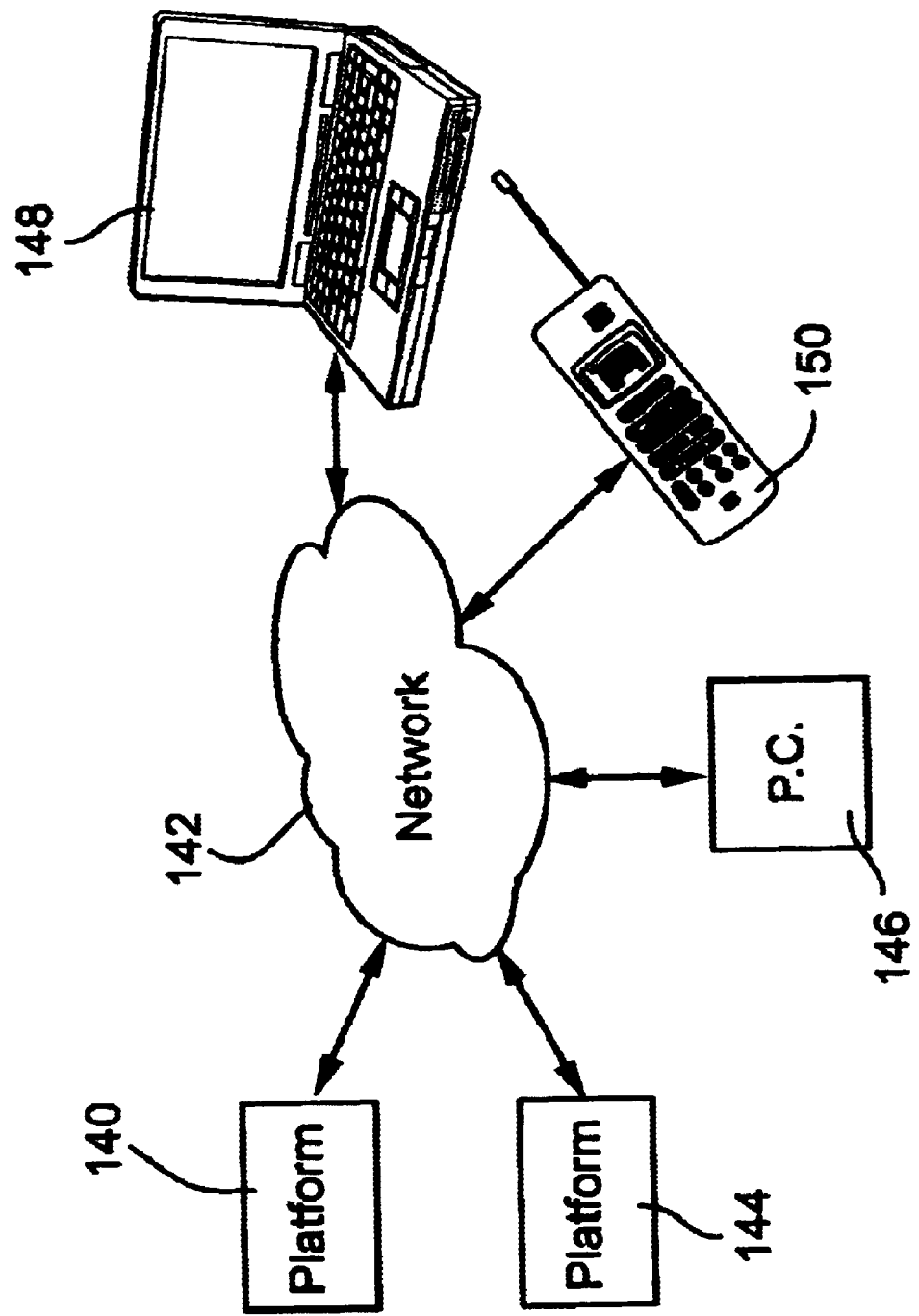
FIG. 18 is a generalized block diagram showing how the platform of FIG. 17 may interact with other platforms, compatible or otherwise over a network.

Reference is now made to FIG. 18, which shows how the game platform of FIG. 17 may be used to play against other players over a network. A first platform 140 is connected to a network 142 such as the Internet. Another platform 144 of the same or compatible kind also connects to the same network 142 and data is passed between them using their respective communication subsystems so that a game may be conducted between them.

In addition to a compatible platform, a game may also be conducted against an incompatible platform such as a standard P.C. 146 running the same application software but lacking the other subsystems. The P.C. 146 is connected to the network 142 in the normal way and data is transferred so that the platforms 140 and 144 participating in the game treat the PC player as any other absent player and move tokens in respect thereof. However the PC user may be restricted to an animated screen display. Likewise other incompatible platforms such as a notebook or palmtop computer 148 may participate and similarly, although they may have a lower display capability, so may data enabled mobile phones such as phone 150.

Figure 19:
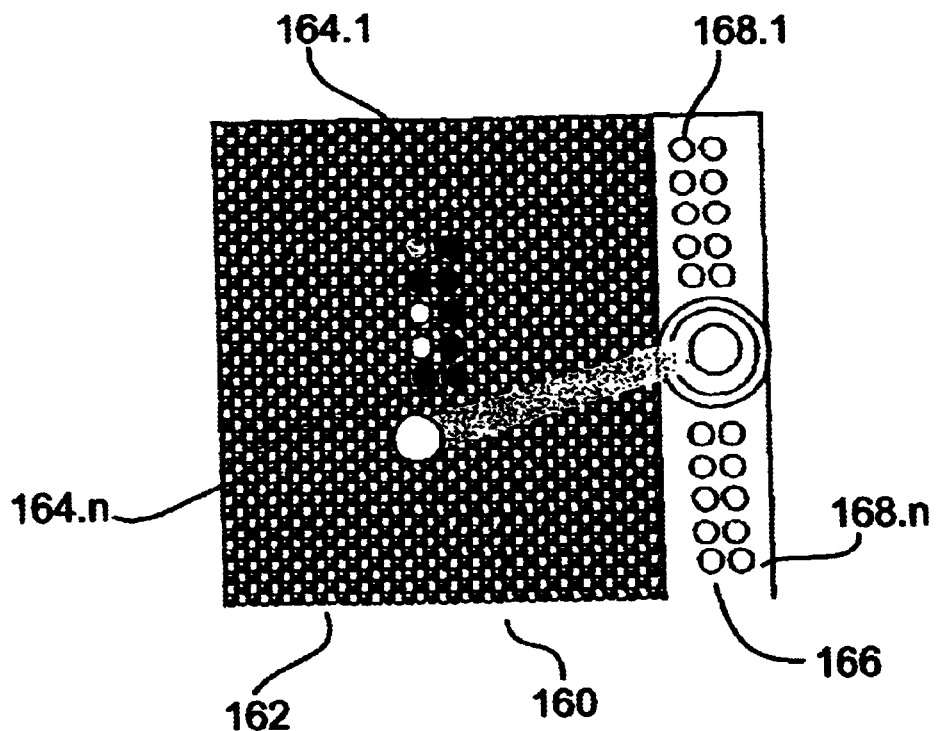
FIG. 19 is a generalized schematic diagram showing a playing surface with a storage tray for use with embodiments of the present invention.

Reference is now made to FIG. 19, which shows a token storage tray 160. As will be recalled, in one embodiment, the tokens are not given individual identification features allowing them to be distinguished from the other tokens. Rather, a process of 'dead reckoning' is used to determine the location of a given token given a known starting position, a restriction on possible legal moves and the location of the tokens at the end of the move. In order for this system to work, it is preferable that each token starts from a known position before being placed on the board.

In FIG. 19 a board surface 160 comprises a playing area 162 with a series of tokens 164.1 . . . 164.n distributed thereon, and a storage area 166 comprising individual storage positions 168.1 . . . 169.n for each of the tokens 164.1 . . . 164.n. At the beginning of each game, each token is take from its individual storage position and its identity noted. It is then moved to a start position and is followed during the course of the game as described above so that its position is always known.

Figure 20:
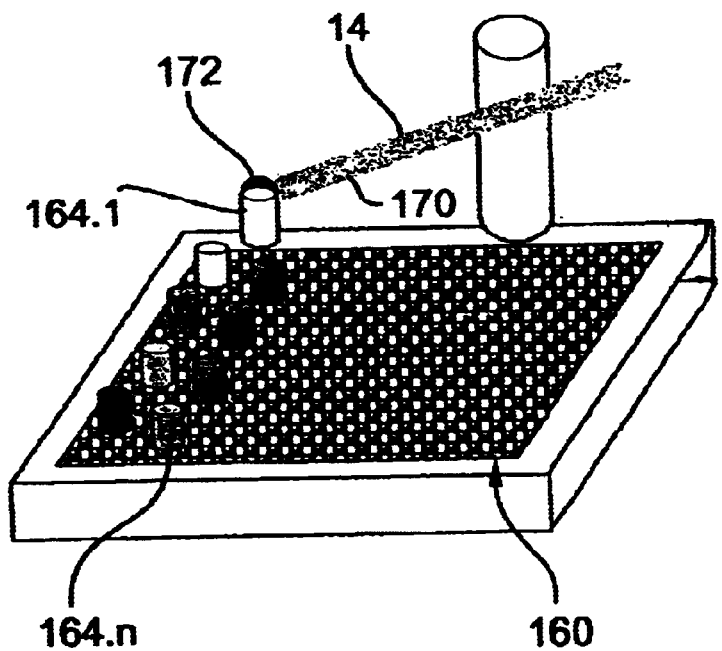
FIG. 20 is a generalized schematic diagram showing the use of the robot arm in moving tokens.

Reference is now made to FIG. 20, which is a generalized schematic diagram of a board surface 160 showing a robot arm 14 moving a playing piece 164.1. The robot arm 14 preferably comprises an interface 118 (FIG. 17) to the microprocessor 10 (FIG. 17), a control unit (not shown), an electro-mechanical arm 170 and a grip 172. For location of the token to be moved the robot arm 14 relies on data obtained by the token detection subsystem, although it may additionally be provided with an auxiliary camera mounted at or near the grip 172 for fine positioning. In addition, the robot arm may be provided with an identifier, so that the location subsystem can locate the robot arm.

Reference is now made to FIG. 21, which is a simplified diagram showing a sensible die operable in accordance with embodiments of the present invention. In the diagram of FIG. 21 a cross-section of a die 170 has a resonant circuit 172 . . . 178 on each one of its sides. It will be appreciated that FIG. 21 is two-dimensional for simplicity only and that the die is preferably a three-dimensional cube having six sides and thus six resonant circuits. Each one of the resonant circuits 172 . . . 178 is set at a different resonant frequency. A six-position weighted switch 180 selects one of the resonant circuits 172 . . . 178 in accordance with the orientation of the die 170. The system is able to deduce, from the detected frequency, which side of the die 170 is uppermost and thus which is the selected value. It will be appreciated that the embodiment shown in FIG. 21 is only one of many possible ways of producing a sensible die.

An alternative to a sensible die is a graphic representation of a die shown on a computer screen. A software element uses a random generator to select a number between 1 and 6 and the graphic representation displays die selection to the user.

Another alternative is to use a standard die. If used in conjunction with the visual detection embodiment, then it may be possible for the system to determine the score shown by the die. Otherwise, the system may determine from a move made by a human player what score was shown on the die. For a move to be made by an artificial player, the score shown on the die could be manually entered into the system or a random generator as described above could be used.

Reference is now made to FIG. 22, which shows another preferred embodiment of the present invention. In the embodiment of FIG. 22, a token 190 is located on a playing surface 192. The token 190 comprises an identifier circuit 194 which may be a resonant circuit as described above or it may be a small transmitter, typically either an ultrasonic transmitter or an infra-red, r.f. or microwave transmitter. The identifier is triggered by a trigger circuit 196 placed in association with the playing surface 192 to produce a pulse. The pulse is picked up at each one of a series of receivers 198 . . . 202 and the location of the token is calculated from differences in the signal received at each of the receivers, using methods well known to the skilled person. For example, if the identifier is an ultrasonic identifier then a time difference between receipt at each receivers may conveniently be used. If the identifier is electromagnetic then the phase of the received signal at each receiver could be used to determine the location of the token.

In accordance with embodiments of the present invention there is thus provided visual and inductive methods and apparatus for detecting the positions of tokens on a flat surface, in particular a flat display screen. The screen is part of a gameplay platform that provides a display that serves as a game board for a particular game to be played. The platform is able to detect and move playing pieces in accordance with game rules and to interact with a human player who manually moves playing pieces.

The platform is preferably able to interact with other compatible and incompatible platforms over a network such as the Internet.

In the claims which follow, reference to physical objects includes reference to figures, tokens, counters or playing pieces for moving over a game surface, generally having a meaning in relation to a game or simulation or indicating a player's position on a game board. Alternatively, the pieces may be pointers or styluses.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is nor limited to what has been particularly shown and described hereinabove. Rather the scope of the present invention is defined by the appended claims, and includes both combinations and subcombinations of the various features described hereinabove as well as variations and modifications thereof, which would occur to persons skilled in the art upon reading the foregoing description.

We claim:

1. A method of detecting each one of a set of physical objects, placed over a graphic display device, each of said objects comprising an identifier, the method comprising:
   continuously electronically refreshing a displayed playing image on said graphic display device,
   placing at least one of said objects at a location over said displayed playing image such that said object is separated from said graphic display device and said displayed playing image by a transparent conductive foil,
   detecting said identifier by means of a detecting unit associated with said transparent conductive foil,
   outputting a signal from said detecting unit, which signal bears information of said location, and
   determining from said signal, information of said location.

2. A method according to claim 1, each object having a unique identity within said set, wherein said indicator is indicative of said identity, said signal output from said detecting unit further bearing information of said unique identity and wherein said step of determining comprises determining said unique identity.

3. A method of detecting each one of a set of physical objects, placed over a graphic display device, each of said objects comprising a visual identifier, the method comprising:
   continuously electronically refreshing a displayed playing image on said graphic display device,
   placing at least one of said objects at a location over said graphic display device and said displayed playing image,
   detecting said visual identifier using image recognition capability,
   outputting a signal upon recognition of said identifier, said signal bearing recognition information of said object and location information, and
   determining from said signal, information of said location.

4. A method according to claim 1, wherein said identifier is an electronic identifier, said identifier producing an output which is identifiable within said set.

5. A method according to claim 4, wherein said electronic identifier is a resonant circuit and wherein said output is electromagnetic radiation at a frequency unique within said set.

6. A method of detecting each one of a set of physical objects, placed over a graphic display device, each of said objects comprising an identifier, the method comprising:
   continuously electronically refreshing a displayed playing image on said graphic display device,
   placing at least one of said objects at a location over said graphic display device,
   detecting said identifier by means of a detecting unit,
   outputting a signal from said detecting unit, which signal bears information of said location, and
   determining from said signal, information of said location, wherein said identifier is a transmitter, wherein there is provided a step of triggering said transmitter to emit a signal, wherein there is provided a step of measuring one of a group comprising a time delay between triggering and receiving said emitted signal and a phase change between a transmitted and corresponding received signal, to each one of a plurality of receivers, and wherein there is provided a step of deducing the location of the object by comparing said one of said group at each of said plurality of receivers.

7. A method according to claim 6, wherein said transmitter is any one of a group comprising an ultrasound transmitter, an infra-red transmitter, a radio frequency transmitter and a microwave transmitter.

8. A method according to claim 1, wherein said physical object is externally powered.

9. A method according to claim 1, wherein said physical object is internally powered.

10. A method according to claim 1, wherein said physical object is any one of a group comprising a game piece, a simulation piece and a pointer.

11. A method according to claim 6, wherein said graphic display device is a flat screen graphic display device.

12. A method according to claim 1, wherein said graphic display device device is a tablet device.

13. A method according to claim 1, comprising the further step of using a token moving subsystem to move said at least one physical object over said graphic display device.

14. A method according to claim 1, wherein said token moving subsystem includes an actuable arm.

15. A method according to claim 14, said actuable arm comprising an identifier.

16. A method according to claim 1, further comprising a registration step, carried out before said determining step, of indicating a plurality of known positions on said graphic display device, detecting said known positions and mapping between said known positions and said detected positions.

17. A method according to claim 1, wherein said detecting unit comprises a co-ordinate system of detecting coils arranged on said graphic display device.

18. A method according to claim 1, each of said physical objects being excitable by a predetermined resonant frequency respectively, wherein said graphic display device is surrounded by an excitation coil operable to output a signal detectable by objects in said set each having a different resonant frequency, to excite said objects.

19. A method according to claim 18, said signal being a wide band signal.

20. A method according to claim 18, said signal comprising a train of short pulses.

21. A method according to claim 18, said signal comprising a series of frequencies corresponding to resonant frequencies of said identifiers of respective objects in said set.

22. A method according to claim 1, comprised in either one of a group comprising a game and a simulation.

23. A device for detecting physical objects, each object having a detectable identifier, the objects being for disposal on an electronically refreshable graphic display device capable of serving as a visual background for placement of said physical objects, the apparatus comprising:

a detecting unit placed about said electronically refreshable graphic display device, operable to detect a location of said identifier relative to said electronically refreshable graphic display device, and to output a signal bearing information of said location, and a transparent conducting foil, for embedding conductors of said detecting unit, located on an upper surface of said electronically refreshable display device, wherein said device is operable to determine, by electronic processing, from said signal, a relative location of said physical object in relation to said electronically refreshable graphic display device, and wherein said upper surface of said electronically refreshable graphic display device comprises an electronically active display surface on which said objects are locatable.

24. A device according to claim 23, wherein there is provided a set of physical objects to he detected and said identifier is unique to each physical object within said set.

25. A device according to claim 23, wherein said detecting unit is a camera and said electronic processing comprises image processing.

26. A device according to claim 25, wherein said identifier is a visually sensible mark.

27. A device according to claim 26, wherein said visually sensible mark is selected for effectiveness in conjunction with an image processing algorithm being used.

28. A device according to claim 23, wherein said identifier is a resonant circuit having a resonant frequency.

29. A device according to claim 28, wherein there is provided a set of physical objects to ba detected, each object having a unique resonant frequency.

30. A device according to claim 28, having a grid laid out over said graphic display device, said grid comprising conductors.

31. A device according to claim 30, said conductors being embedded in said transparent foil.

32. A device according to claim 31, said conductors being embedded in two transparent foils.

33. A device according to claim 30, wherein first set of conductors in said grid serve as transmitter conductors to transmit signals tuned to cause resonance in a correspondingly tuned physical object, and a second set of conductors serve as receivers of resonance signals from a closely located physical object, thereby enabling said device to locate a physical object.

34. A device according to claim 33, wherein said first set of conductors is embedded in a first transparent foil and said second set of conductors is embedded in a second transparent foil.

35. A device according to claim 34, further comprising at least one electro-optical sensor for detecting the position of at least one of said foils on said graphic display device.

36. A device according to claim 30, further having a coil surrounding said graphic display device, said coil being operable to transmit a signal able to cause in resonance in a physical object, said grid being operable to pick up said resonance via conductors close to said resonating physical object and thereby to locate said physical object.

37. A device according to claim 36, said signal being able to cause resonance in physical objects having a range of resonant frequencies.

38. A device according to claim 37, said signal being a wide band signal.

39. A device according to claim 37, said signal comprising a train of short pulses.

40. A device according to claim 37, said signal comprising a series of frequencies corresponding to resonant frequencies of said identifiers of respective objects in said set.

41. A device according to claim 40, wherein said electronic processing comprises identifying frequencies appearing on individual conductors of said grid following issuance of said signal.

42. A device according to claim 41, wherein said electronic processing comprises a first Fourier transform.

43. A device according to claim 41, wherein the frequencies of said physical objects are known, and said electronic processing comprises frequency correlation.

44. A device according to claim 43, having unique storage positions for each physical object.

45. A device according to claim 43, wherein there is provided a set of physical objects to be detected, the device comprising device following functionality, operable to infer from knowledge of a previous position of a first physical object, knowledge of at least one rule for said physical object, and a detected position of said set of physical objects following a move, the current position of said first physical object.

46. A device according to claim 43 further comprising at least one sensible die for selecting a score based on its orientation, wherein said detecting unit is operable to determine the orientation of said die, said device thereby being operable to deduce said score.

47. A device according to claim 46, wherein said sensible die comprises a plurality of resonant circuits each one being associated with a different orientation of said die and being activated when said die is in the respective orientation, and wherein said detecting unit is operable to detect said resonant frequency.

48. A device according to claim 47, wherein said sensible die comprises a weighted switch for selecting between said resonant circuits based on said orientation of said die.

49. A device according to claim 43, when used in association with a game utilizing at least one die, wherein said device comprises a score deducer for deducing a score shown by said at least one die from a detected move of said objects.

50. A device according to claim 43, further comprising an interface module for interfacing with the detecting unit.

51. A device according to claim 50, wherein said interface module is part of an operating system.

52. A sensible die for use with an electronic game platform, said die having a plurality of orientations and a score associated with each orientation, the die comprising a plurality of signal generating circuits each one being for generating a signal for remote detection and being associated with one of said orientations of said die and being selectable for signal generation when said die is in the respective orientation.

53. A sensible die according to claim 52, comprising a weighted switch for selecting between said signal generating circuits based on said orientation of said die and thereby associating each one of said signal generating circuits with a respective orientation.

54. A sensible die according to claim 53, wherein said signal generating circuits are resonant circuits.

55. A sensible die according to claim 54, wherein each said resonant circuit is operable to resonate at a different frequency, thereby indicating said orientation of said die.

56. Method according to claim 1, further comprising:

triggering said identifier to output an identifying signal substantially about said detecting unit, waiting for a predetermined delay, detecting said identifying signal at said detecting unit, and analyzing said detection, thereby to deduce said location and identification of said at least one object.

57. Method according to claim 1, further comprising combining said determined location with determined location information obtained remotely over a network.

58. Method according to claim 56, wherein said detecting unit comprises two sets of generally parallel conductive lines substantially orthogonal to each other.

59. Apparatus for detecting at least one of a plurality of physical objects, placed over an electronic display, each of said objects comprising an identifier comprising a resonant circuit having a predetermined resonant frequency within a predetermined frequency range, the apparatus comprising:

a sensing surface placed about said electronic display, having two sets of generally parallel conductive lines substantially orthogonal to each other and being electrically isolated from one another;

an excitation coil located substantially about said conductive lines to define a detection area therewithin;

a signal generator for supplying electromagnetic energy signals comprising at least one frequency within said predetermined frequency range to said excitation coil; and a detecting unit, associated with said two sets of conductive lines, for detecting electromagnetic energy at a frequency within said predetermined frequency range on said two sets of conductive lines, whereby a respective electromagnetic energy signal is operable to activate at least one of said physical objects, to resonate at a respective frequency to induce a response in said two sets of conductive lines, said detecting unit being operable to wait for a predetermined delay time after issuance by said signal generator of respective signals, to detect said response, and to analyze said response at both said two sets of conductive lines to identify a location and identity of said physical object, in relation to said electronic display.

60. Apparatus according to claim 59, further being for detecting a plurality of physical objects, each having a respective resonant frequency, said electromagnetic energy signal being a composite signal comprising a range of frequencies and said detecting unit comprising a transform unit to transform a response to said composite signal into the frequency domain, thereby to distinguish responses of different physical objects respectively.

61. Apparatus according to claim 59, wherein said graphic display device comprises an active display.

62. Apparatus according to claim 59, wherein said two sets of conductive lines in said electronic board are patterned on at least one transparent foil.

63. A method of detecting at least one of a set of physical objects, placed at a location over a graphic display device, each of said objects comprising an identifier, the method comprising:

placing at least one of said objects at a respective location on said graphic display device, emitting a triggering signal from a triggering unit substantially about said graphic display device, emitting an identifying signal from said object in response to said triggering signal, waiting for a predetermined delay, detecting said identifying signal at two sets of generally parallel conductive lines substantially orthogonal to each other, formed from a transparent conductive foil and located on a sensing surface located about said graphic display device, and analyzing said detection, thereby to deduce said location and identification of said at least one object on said graphic display device.

64. Method according to claim 63, wherein each object has a respective resonant frequency, said signal being a composite signal comprising a range of frequencies, the method further comprising transforming said response into the frequency domain, thereby to distinguish responses of different physical objects respectively.

65. Method according to claim 63, wherein said detection at said two sets of generally parallel conductive lines substantially orthogonal to each other is carried out simultaneously.

66. The apparatus of claim 59, wherein one of said physical objects is internally powered.

67. The apparatus of claim 59, wherein one of said physical objects is one of a group comprising a game piece, a simulation piece and a pointer.

68. The apparatus of claim 59, wherein said graphic display device comprises a flat screen graphic display device.

69. The apparatus of claim 59, further comprising a token moving subsystem able to move at least one of said physical objects in the vicinity of said graphic display device.

70. The apparatus of claim 59, further comprising at least one sensible die for selecting a score based on orientation thereof, wherein said detecting unit is further operable to determine said orientation, thereby to ascertain said score.

\* \* \* \* \*